US 6,641,309 B2

(12) United States Patent
Gancarcik et al.

(10) Patent No.: US 6,641,309 B2
(45) Date of Patent: Nov. 4, 2003

(54) COMBINATION VISIBLE AND INFRARED PIPE

(75) Inventors: Edward Peter Gancarcik, Ottawa (CA); Peter Mathieson Craig, Kanata (CA)

(73) Assignee: Mitel Knowledge Corporation (CA)

( * ) Notice: Subject to any disclaimer, the term of this patent is extended or adjusted under 35 U.S.C. 154(b) by 166 days.

(21) Appl. No.: 09/861,207

(22) Filed: May 18, 2001

(65) Prior Publication Data

US 2001/0043780 A1 Nov. 22, 2001

(30) Foreign Application Priority Data

May 18, 2000 (GB) ................................................ 0011877

(51) Int. Cl.[7] ................................................ G02B 6/36
(52) U.S. Cl. ............................................ 385/88; 385/12
(58) Field of Search .............................. 385/2, 88, 8, 9, 385/12, 14, 15, 31

(56) References Cited

U.S. PATENT DOCUMENTS

| | | | | |
|---|---|---|---|---|
| 4,764,984 A | * | 8/1988 | Franke et al. ............... | 359/172 |
| 4,876,446 A | * | 10/1989 | Kambe et al. ............... | 250/221 |
| 5,347,601 A | * | 9/1994 | Ade et al. ...................... | 385/3 |
| 5,410,410 A | * | 4/1995 | Yamazaki et al. ........... | 356/601 |
| 5,785,404 A | * | 7/1998 | Wiese ........................... | 362/555 |
| 5,901,261 A | * | 5/1999 | Wach ............................ | 385/38 |
| 5,963,349 A | * | 10/1999 | Norte ........................... | 359/116 |
| 6,327,412 B1 | * | 12/2001 | Kakui et al. ................. | 385/126 |

* cited by examiner

*Primary Examiner*—Frank G. Font
*Assistant Examiner*—Kanh C. Kianni
(74) *Attorney, Agent, or Firm*—Jones Day

(57) ABSTRACT

Many device components include a printed circuit board supporting light-generating means along with a light pipe to conduct light from the light-generating means to a diffuser adjacent the surface of the components. The present invention offers an improvement whereby the light pipe can be utilized both for transmission of visible wavelengths and for transmission/reception of invisible (infrared) wavelengths. To accomplish this, a light pipe is constituted of two adjacent portions, and an infrared transceiver module is coupled into both portions.

10 Claims, 3 Drawing Sheets

COMBINATION VISIBLE AND INFRARED PIPE

This invention relates generally to the handling of both infrared light and visible light, utilizing a single light pipe. More particularly, this invention provides a construction for a component, and a method of operation for the component, such that the function of transporting light from an optically inaccessible, light-generating location to an optically accessible region on the component can coexist with the infrared features of an appropriate transceiver device.

BACKGROUND OF THIS INVENTION

For various devices such as telephones, it is known to utilize light pipes extending from internal, optically inaccessible locations to external, optically accessible locations. Such light pipes are used to conduct visible light in products requiring visible status indicators. Typically, light pipes of this kind terminate at a light diffuser.

We have determined that it is possible to modify light pipes in such a way that status indication and infrared features can coexist within the same unit, thus leading to smaller product sizes and lower costs. These considerations are becoming increasingly important, as device portability becomes more desirable.

As a general principle, it is of advantage to have more integrated product designs, and also the ability to add new features to existing components.

PRIOR ART

It is known to utilize a light pipe to transfer light energy from a source such as one or more LEDs, located on a printed circuit board (PCB), up to a visually accessible surface of a product, where the light pipe typically ends at a light diffuser.

GENERAL DESCRIPTION OF THIS INVENTION

The present invention seeks to improve upon the prior art just mentioned, by allowing infrared energy and visible light to coexist and be handled within the same unit.

More particularly, this invention provides, for use with a component defining a surface, the component including a printed circuit board supporting light-generating means, along with light-transporting means for conducting light from the light-generating means to a light diffuser adjacent the surface, the improvement wherein the light-transporting means is in the form of two juxtaposed light pipe portions, and wherein an infrared transceiver module is coupled into both of the light pipe portions adjacent the light-generating means, the light pipe portions both transporting light to said light diffuser.

Further, this invention provides, in a component defining a surface and including a printed circuit board supporting light-generating means, and further including light-transporting means for conducting light from the light-generating means to a light diffuser adjacent the surface, an improved method of operation wherein two juxtaposed light pipe portions transport light to said light diffuser, and wherein an infrared transceiver module is coupled into both of the light pipe portions adjacent the light-generating means.

GENERAL DESCRIPTION OF THE DRAWINGS

Three embodiments of this invention are illustrated in the accompanying drawings, in which like numerals denote like parts throughout the several views, and in which.

DETAILED DESCRIPTION OF THE DRAWINGS

Figure 1:
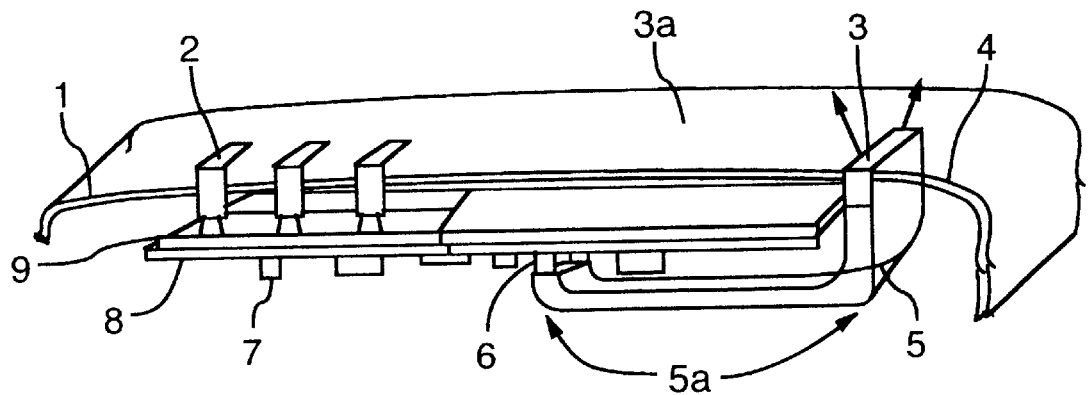
FIG. 1 is a sectioned, oblique view of a component representing the prior art.

FIG. 1 illustrates how a light pipe 5 and a light diffuser 3 are currently used to direct light from two LEDs 6 located on a printed circuit board 8 (PCB) up to the surface 3a of a component 4. The PCB supports various electronic components 7 facing in the opposite direction from the surface of the component 4. An elastomeric strip 9 allows depression of a key button 2 to be sensed by detection circuitry on the PCB. The light pipe 5 performs the same function as the key buttons, in that both items bring product features out to convenient physical locations.

Figure 2:
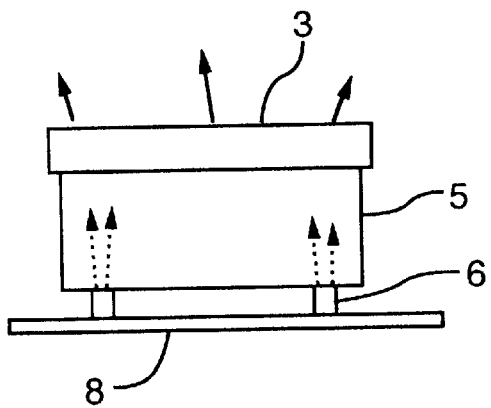
FIG. 2 is a schematic elevation showing a major component representative of the prior art.

FIG. 2 shows the prior art light pipe 5 in greater detail. Two LEDs 6 direct light energy up to through light pipe 5 to the diffuser 3 where it can be viewed. In this instance, the light pipe is shown to be of substantial size, since it conveys important information to the user (i.e. message waiting indicator, etc.). The curved parts visible at 5a in FIG. 1 have been "straightened out" in FIG. 2, in order to simplify the explanation of its use in an infrared context.

An important aspect of the present invention is the modification of the construction of the light pipe such that, using the concept known as wavelength division multiplexing (WDM), it is possible to use the light pipe for transmission of visible wavelengths and transmission/reception of invisible (infrared) wavelengths. For a better understanding of this concept, attention is directed to FIG. 3.

Figure 3:
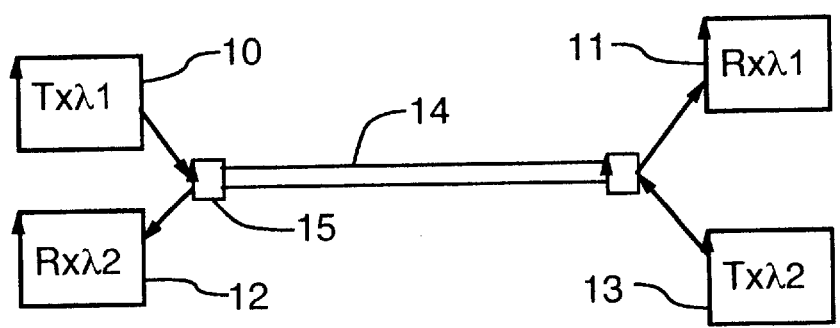
FIG. 3 is a further schematic diagram, useful to explain the theoretical background to this invention.

Wavelength division multiplexing has its origins in the fibre optic communications field. FIG. 3 shows two transmitting light sources 10, 13 and detectors 11, 12 operating at spectral wavelengths coupled at 15 into a single fibre optic cable 14 (effectively reducing the number of fibres required in an installation).

Internal reflections from the transmitter 10 travelling down the cable 14 and subsequently picked up by the receiver 12 are ignored because of the receiver's sensitivity to its optimal wavelength.

The unique aspect of the present invention is that by modifying the light pipe only, a new feature can be incorporated into a product, without requiring changes to the external plastics.

Figure 4:
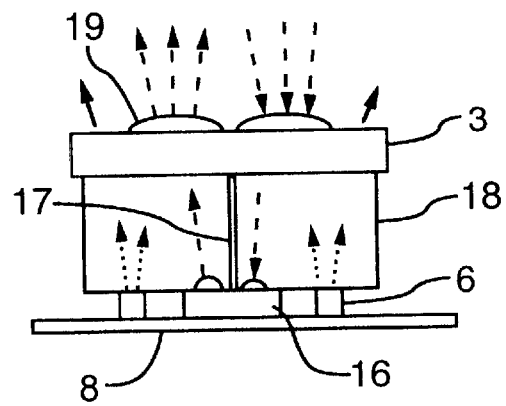
FIG. 4 is a schematic elevational view of a first embodiment of the major component which is the focus of this invention.

Illustrated in FIG. 4 is a method of coupling an infrared transceiver into the previously described light pipe. An infrared transceiver module 16 is coupled into the light pipe 18, which has been moulded to conform to the shape of the lenses of the transceiver. A slot 17 is provided within the light pipe material, in order to separate the infrared transmitter energy and prevent it from being reflected back to the receiver immediately adjacent to it. The top of the light pipe is moulded to provide a lenticular protuberance 19 so that it distributes/collects infrared energy over a wider cone angle. For illustrative purposes the drawings show transmitted energy at two separate spectral wavelengths as arrows of different lengths. The short arrows represent photons emitted by the visible red LEDs (approximately 660 nm) and the longer dashed arrows are photons emitted by the invisible infrared LEDs (approximately 890 nm).

Figure 5:
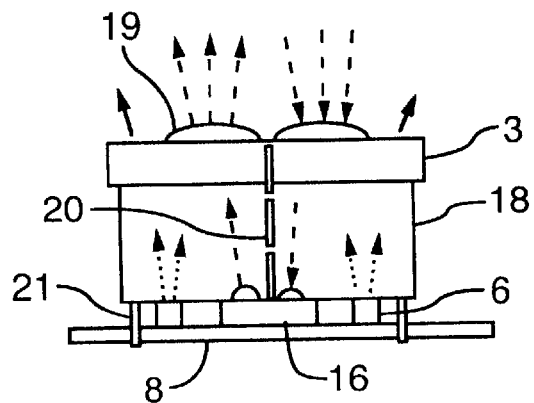
FIG. 5 is a schematic elevational view of a second embodiment.

In FIG. 4, the light pipe consists of two separate pieces joined together by the upper light diffuser 3. As an alternative to this approach, the embodiment illustrated in FIG. 5 incorporates an intermittent slot 20 into the light pipe, so that a single light pipe provides optical separation between the halves. The narrow aperture provided by the slots minimizes energy coupling between the halves, and yet allows the piece to be manufactured as a single unit. FIG. 5 also shows alignment pins 21 moulded into the light pipe 18. These pins 21 fit into holes drilled in the PCB 8, and allow accurate positioning of the light pipe 18 over the optical devices 6.

It is expected that the increased separation between the infrared transceiver and the front of the product created by using the inventive light pipe 18 will result in greater ESD immunity.

Figure 6:
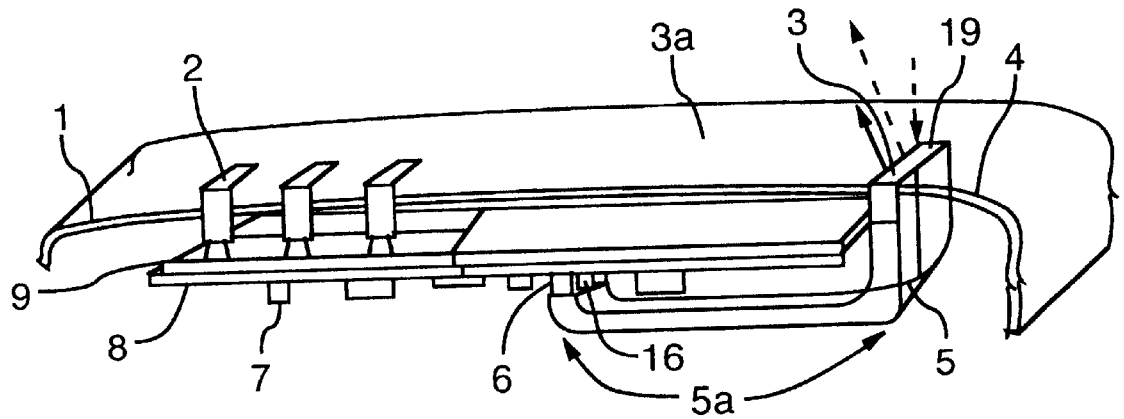
FIG. 6 is a view similar to FIG. 1, but showing the incorporation of the inventive structure into a component.

FIG. 6 shows how an infrared transceiver 16 could be incorporated with a specially modified light pipe into the prior art product shown in FIG. 1.

Figure 7:
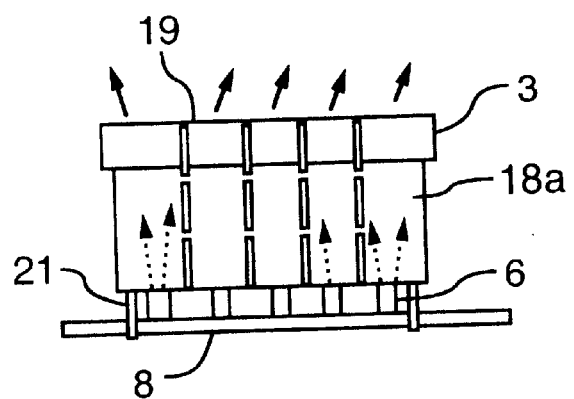
FIG. 7 is a schematic elevational view of a third embodiment.

Further variations of this invention are possible. For example, FIG. 7 shows the concept of a single piece moulded plastic light pipe 18a with a number of slots, potentially simplifying the design of LED arrays within products.

While several embodiments of this invention have been illustrated in the accompanying drawings and described hereinabove, it will be evident to those skilled in the art that changes and modifications may be made therein without departing from the essence of this invention, as set forth in the appended claims.

The embodiments of the invention in which an exclusive property or privilege is claimed are defined as follows:

1. For use with a component defining a surface, the component including a printed circuit board supporting light-generating means, along with light-transporting means for conducting light from the light-generating means to a light diffuser adjacent the surface, the improvement wherein the light-transporting means is in the form of two juxtaposed light pipe portions separated by a rectilinear slot having spaced-apart bridges, both light pipe portions being integrally molded together, and wherein an infrared transceiver module is coupled into both of the light pipe portions adjacent the light-generating means, the light pipe portions both transporting light to said light diffuser.

2. The improvement claimed in claim 1, in which the light diffuser is shaped to define at least one lenticular protuberance, whereby light is distributed or collected over a wider cone angle than would occur if the diffuser were without such protuberance.

3. The improvement claimed in claim 1, in which the light diffuser is shaped to define at least one lenticular protuberance, whereby light is distributed or collected over a wider cone angle than would occur if the diffuser were without such protuberance.

4. The improvement claimed in claim 3, in which alignment pins are molded into the light pipe portions, the pins being adapted to fit into holes provided in the printed circuit board, thus allowing accurate positioning of the light pipe portions with respect to the said light-generating means.

5. The improvement claimed in claim 1, in which alignment pins are molded into the light pipe portions, the pins being adapted to fit into holes provided in the printed circuit board, thus allowing accurate positioning of the light pipe portions with respect to the said light-generating means.

6. In a component defining a surface and including a printed circuit board supporting light-generating means, and further including light-transporting means for conducting light from the light-generating means to a light diffuser adjacent the surface, an improved method of operation wherein two juxtaposed light pipe portions transport light to said light diffuser the two light pipe portions being separated by an elongate, rectilinear slot having spaced-apart bridges, both light pipe portions being integrally molded together, and wherein an infrared transceiver module is coupled into both of the light pipe portions adjacent the light-generating means.

7. The method claimed in claim 6, in which the light diffuser is shaped to define at least one lenticular protuberance, whereby light is distributed or collected over a wide cone angle than would occur if the diffuser were without such protuberance.

8. The method claimed in claim 6, in which the light diffuser is shaped to define at least one lenticular protuberance, whereby light is distributed or collected over a wider cone angle than would occur if the diffuser were without such protuberance.

9. The method claimed in claim 8, in which alignment pins are molded into the light pipe portions, the pins fitting into holes provided in the printed circuit board, thus accurately positioning the light pipe portions with respect to the said light-generating means.

10. The method claimed in claim 6, in which alignment pins are molded into the light pipe portions, the pins fitting into holes provided in the printed circuit board, thus accurately positioning the light pipe portions with respect to the said light-generating means.

* * * * *